W. W. BARDSLEY.
MECHANISM FOR CONTROLLING ACTION.
APPLICATION FILED JUNE 19, 1911.

1,072,416.

Patented Sept. 9, 1913.
3 SHEETS—SHEET 1.

WITNESSES
E. S. Ogden
Frederic A. Greene

INVENTOR
Willard W. Bardsley.
BY Howard E. Barlow
ATTORNEY

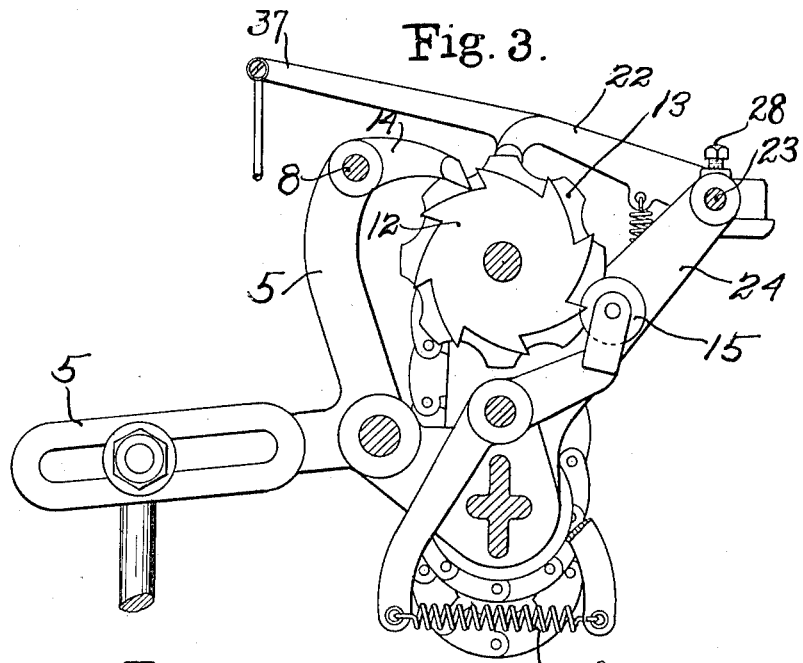
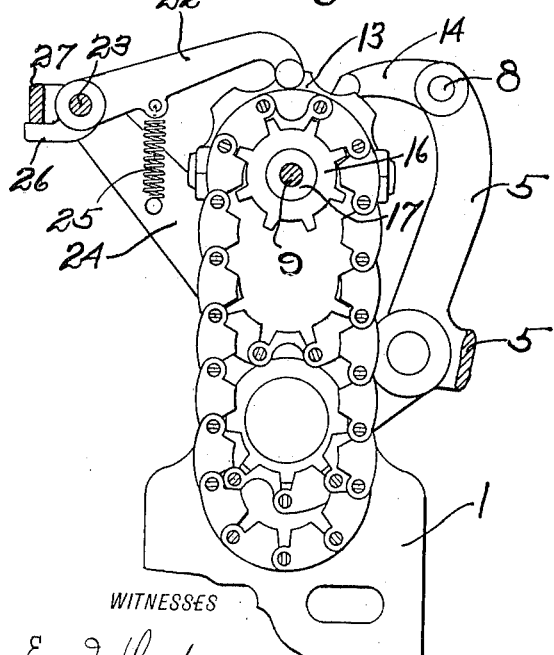
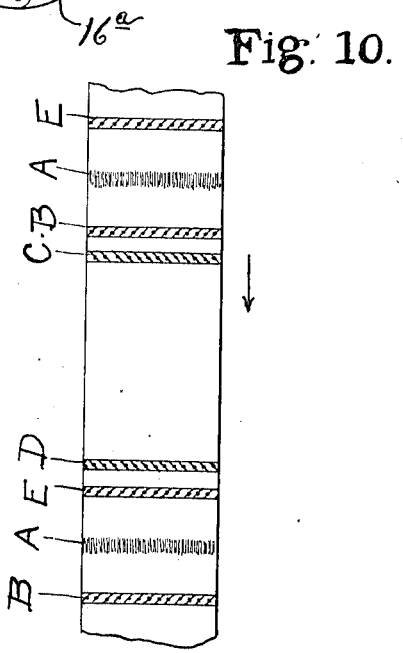

W. W. BARDSLEY.
MECHANISM FOR CONTROLLING ACTION.
APPLICATION FILED JUNE 19, 1911.
1,072,416.
Patented Sept. 9, 1913.
3 SHEETS—SHEET 3.
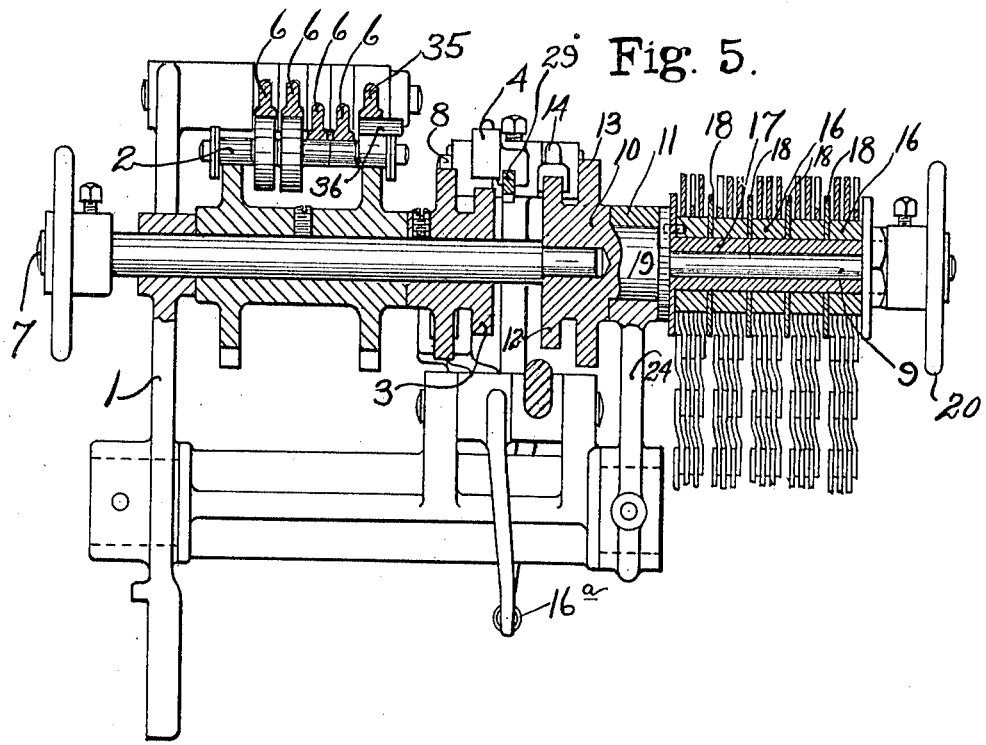
Fig. 5.
Fig. 8.
Fig. 6.
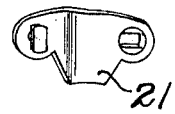
Fig. 9.
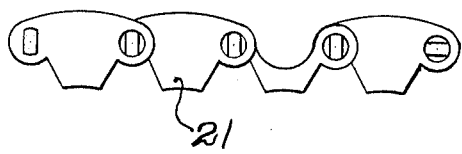
Fig. 7.
WITNESSES
E. J. Ogden
Frederic A. Greene
INVENTOR
Willard W. Bardsley.
BY Howard E. Barlow
ATTORNEY ced controllers.

UNITED STATES PATENT OFFICE.

WILLARD W. BARDSLEY, OF PROVIDENCE, RHODE ISLAND.

MECHANISM FOR CONTROLLING ACTION.

1,072,416. Specification of Letters Patent. Patented Sept. 9, 1913.

Application filed June 19, 1911. Serial No. 634,103.

*To all whom it may concern:*

Be it known that I, WILLARD W. BARDSLEY, a citizen of the United States, and resident of Providence, in the county of Providence and State of Rhode Island, have invented certain new and useful Improvements in Mechanism for Controlling Action, of which the following is a specification.

This invention relates to mechanism for automatically controlling the time of action of other mechanism whereby said second mechanism may be caused to perform a plurality of different specific functions at predetermined periods.

The invention consists in combining a plurality of sets of coöperating controlling members and rotating the same by a common driver all at a uniform peripheral speed, but each individual member of each set to move in a different cycle, each member of each set being provided with suitable controlling means, which when arranged in proper alinement with one another serve to cause the movement of a controller which in turn controls the action of the second mechanism.

My present invention is an improvement on my Patent No. 907,451, its field of action being greatly broadened over that of said prior patent as my present device is adapted to be used as an indicating mechanism for looms, also to be applied to a knitting machine for controlling the action of its mechanism, or to any other mechanism which it is desired to operate at a plurality of different predetermined periods.

With these and other objects in view, the invention consists of certain novel features of construction, as will be more fully described and particularly pointed out in the appended claims.

Figure 1:
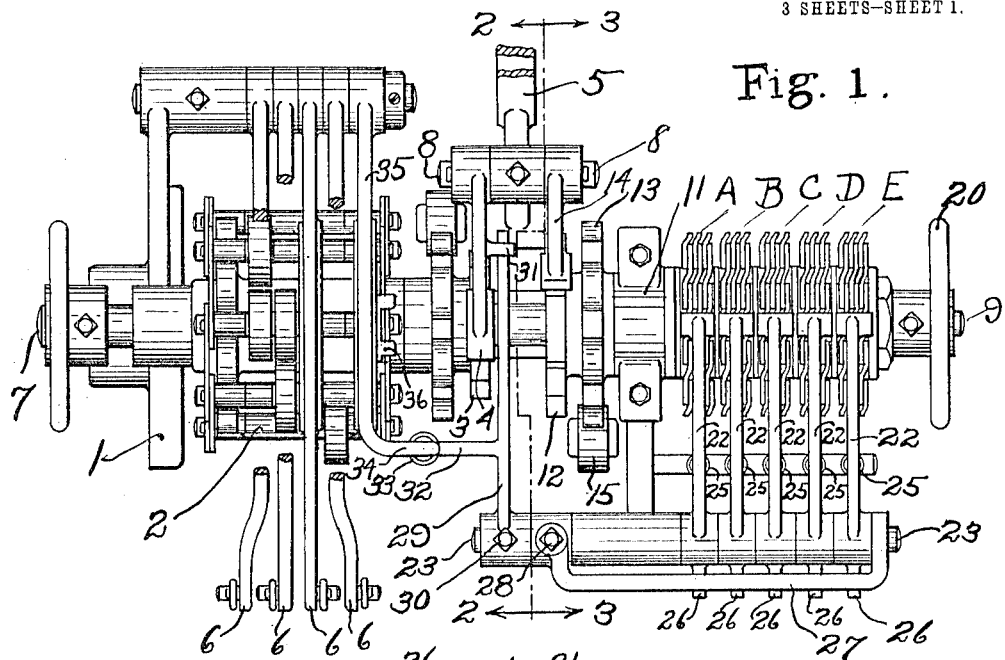
Figure 2:
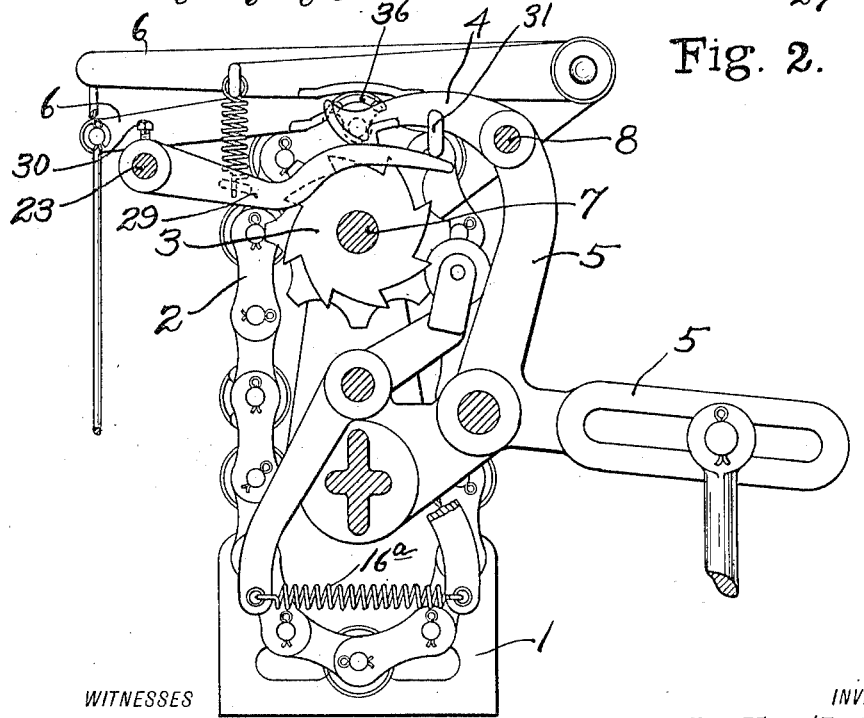

Of the accompanying drawings: Figure 1— is a plan view of a chain head and an indicating mechanism embodying my improvement. Fig. 2— is a sectional elevation taken on the line 2—2 of Fig. 1 looking in the direction of the arrows. Fig. 3— is a vertical section on line 3—3 of Fig. 1 looking in the direction of the arrows. Fig. 4— is a view of the right end of the device showing a plurality of controller chains as operated by a common driver with hand wheel removed. Fig. 5— is a central sectional elevation through both the chain head and the controller device. Fig. 6— is a detail of one of the chain links having a projection for holding the controller out of action. Fig. 7— shows the link having a depression for permitting the controlling arm to move and actuate the second mechanism. Fig. 8— is an edge view showing several of the different chain links connected together. Fig. 9— is a side elevation showing both the depression and projection links connected together. Fig. 10— is a diagrammatic view of a piece of toweling illustrating the number of changes required in the mechanism for weaving such a piece.

Referring to the drawings, 1 designates the main frame of the machine in which is supported both the chain head proper and the controlling device, the chain head being made in the usual way provided with the usual indicating chain 2 and is given a step by step rotary movement through the action of the ratchet wheel 3 mounted on the shaft 7 and actuated by the pull pawl 4 loosely mounted on the pin 8 through the movement of the power transmitting knee lever 5, see Fig. 2, to operate the indicating arms 6 at predetermined intervals, further description of this chain head being deemed unnecessary in this specification it being fully described in my above-mentioned patent.

My improved controlling device includes a central shaft 9 having a hub 10 rotatably mounted in the bearing 11. On this hub is mounted the ratchet wheel 12 and the detent wheel 13 which receive their motion through the push pawl 14 mounted on the pin 8 through the action of the knee lever 5.

The detent 15 under tension of the spring 16ª is arranged to engage the depressions in the detent wheel 13 to retain the shaft 9 against a retrograde movement when the pawl 14 is carried back for another feeding stroke.

On the shaft 9 is mounted a set of driving pinions or toothed wheels 16, see Figs. 4 and 5, all of which are mounted on a central sleeve 17 and are separated from each other by means of collars 18. These pinions are adapted to turn with the shaft 9 and are connected thereto by means of a key or pin as at 19. A hand wheel 20 is attached to the end of the shaft for convenience in setting the controlling members.

My invention consists broadly in the construction and arrangement of parts whereby each set of a plurality of sets of coöperating controlling members may be operated separately to operate at different predetermined periods. These controlling members may be made in disk form each member of each set having a different internal diameter and having internal teeth, if desired, and each having one or more depressions or projections on their peripheries, this disk form of controlling members is best illustrated and described in my patent above referred to. In my present construction I have illustrated these coöperating controlling members as made in the form of a chain, and arranged in individual or independently working sets, each chain of each set having internally formed teeth 21 adapted to engage those of the driving pinion 16 and to also be provided with any predetermined number of depressions or projections as may be desired in the operation of the machine. Each of these controlling chains in the set being of different dimensions, that is, each one is longer than the other. The peripheral speed of these chains are uniform, but as some are longer than others the controlling means of the chains are caused to travel in different cycles, whereby they are adapted to arrive all together in alinement only at predetermined intervals.

In the construction illustrated in the drawings it is arranged that the recesses shall represent the required time for action. Therefore I have provided a set of operating arms 22, 22, see Figs. 1, 3 and 4, all of which are loosely pivoted on the common rock shaft 23 in the bracket 24 and are each pulled downward by their respective springs 25 to normally bear upon the raised portion of the chains as they rotate. Each arm is provided with a rearwardly extending finger 26 adapted to engage the motion transmitting arm 27, which latter extends along over all of said fingers and is rigidly attached to this rock shaft 23 by means of the set screw 28 so that each time one of these controller arms is permitted to be carried downward by the simultaneous arrival of the notches in alinement in any one set of chains the shaft 23 is rocked forward through the movement of the transmitting arm 27. A guard arm 29 is also fixed to this rock shaft by the set screw 30 and extends forward under the laterally extending pin 31 in the pull pawl 4. This guard arm is also provided with a laterally extending finger 32 and is connected by means of the spring 33 to the outwardly turned end 34 of the stop arm 35 whereby when one of the controller arms is carried downward by its spring 25 it also carries downward the guard arm 29 against the tension of its holding spring 33, thereby permitting the pawl 4, which normally rides on the back of said guard arm, to engage its ratchet wheel 3 and start the chain head into action, the first movement of which causes the stop ball or roll 36, see Figs. 2 and 5, to pass out from beneath the stop arm 35, so that even when the controlling arm is again raised and held upward by the continued rotation of its chain the guard arm remains in its downward position and permits the chain head to be actuated through said pawl 4 until the stop ball or roll 36 is again brought beneath its stop arm 35 to raise it and in turn through the spring 33 to raise the guard arm 29 and the pawl 4 instantly stopping further action of the chain head. The controlling device however continues to rotate in its step by step action through its pawl and ratchet 12 and 14 until another set of depressions are brought into alinement in another set of chains when the operation of the chain head is again repeated. It will be noted in this connection that the chain head receives a step by step motion but this motion is imparted to it only at intervals and that the controlling device continuously receives its step by step motion, in other words, the chain head receives a step by step motion at predetermined intervals, while the controlling means receives its step by step motion continuously.

By my improved device it will be seen to be possible for the mechanism to continue and run for hours without imparting action to the secondary mechanism, and then even though the mechanism moves so slowly it is adapted to act instantly and accurately at the appointed time no matter how great the intervals of space between said actions. In other words, it has heretofore been found difficult to obtain an accurate instantaneous action from a very slow moving body but which difficulty is entirely overcome by my method of permitting the secondary mechanism to be actuated only when the controlling members accurately register or arrive in operative relation to each other.

In the manufacture of woven or knitted goods produced by machinery a number of changes are often required, the machine used being provided with special mechanism to cause the necessary changes and also some means to indicate when such mechanism shall act. The means for indicating usually employed is a slow moving disk provided with points placed to indicate as near as possible at the proper time. These points must be placed by trial and when they become worn the time of indication becomes changed. In weaving certain goods, such as handkerchiefs and towels this above-mentioned disk is often used, but where accurate indications are required a pattern chain is employed. These chain controlling members are sometimes very long and costly and require much space in which to work.

In using my invention for weaving figured or fancy goods such as a toweling shown in Fig. 10, the loom is provided with special mechanism to produce the fringe, ends, figured borders and body, the different sets of controllers could be arranged to act as follows, the inner set A, Fig. 1, would cause the fringe mechanism to act at A, Fig. 10, the chain head automatically stopping on a bar which causes the heading to be woven. Set B (Fig. 1) would act at B (Fig. 10) to cause the figured border, the chain stopping on a bar to cause the space and so on through the towel at points C, D and E when the above would be repeated in the next towel. In the present instance the whole number of controlling members are used and therefore represent the whole number of picks in the whole towel from A to A, and the length of body, the heading, and distance between figured borders can be readily changed by starting the sets of controlling members at the proper time. The relation of the members to each other is only changed when a different length of towel is desired.

I do not wish to be restricted to the connecting and operating of a chain head in order to actuate the indicating mechanism required, as indicating arms designated at 37, in Fig. 3, may be connected directly to the controlling arms 22, if desired, by means of which the indications may be received direct without the interposition of the usual chain head.

The great advantage of my present invention over that of my above cited patent is that I employ a plurality of sets of controlling members, so that for instance in a loom where the weaving of a piece of goods requires a certain definite number of changes all of these changes will take place before the pattern repeats itself. These changes are accomplished by the action of the different sets of controlling chains or members which may be arranged to control the action of the loom at the different appointed times to perform the different required functions. As many of these sets may be employed as there are weaving changes required, when the controller will repeat itself and automatically control the continuous action of the loom without again being adjusted. I have shown five distinct sets of controlling members in the drawing, but any desired number of sets may be employed.

By the term "indicating" in the specification and claims I mean "to cause a change in another mechanism by the action of one of the members in my controller or primary mechanism."

I claim:

1. The combination of a plurality of coöperating controlling members, coöperating controlling means in each member, means for actuating said members to move in different cycles to bring said coöperating means into operative relation at predetermined intervals, an operator in said controller mechanism adapted to be actuated when said members are in operative position, a secondary coöperating indicating mechanism, and means whereby the actuation of said operator controls the action of said secondary indicating means.

2. The combination of a plurality of coöperating controlling members, coöperating controlling means in each member, means for actuating said members to move in different cycles to bring said coöperating means into operative relation at predetermined intervals, an operating arm in said controlling mechanism adapted to be actuated when said members are in operative relation, a secondary coöperating indicating mechanism, and means attached to said operating arm whereby the movement of said arm controls the action of said secondary indicating means.

3. The combination of a plurality of sets of coöperating controlling members, coöperating controlling means in each member of each set, means for actuating the controlling means of each individual member of each set at a uniform speed to move in different cycles to bring the controlling means in the members of each set into operative relation at predetermined intervals, and means adapted to be actuated independently when each set of members are in operative relation.

4. The combination of a plurality of sets of coöperating controlling members mounted to be rotated about a common axis, coöperating controlling means in each member of each set, means for actuating the controlling means of each individual member of each set to move at uniform peripheral speeds but in different cycles to bring the controlling means in the members of each set into operative relation at predetermined intervals, and means adapted to be actuated independently when each set of members are in operative relation.

5. The combination of a plurality of sets of coöperating controlling members each member of each set being of different internal dimensions, coöperating controlling means in each member of each set, rotary driving means for said members, an operator in engagement with each set of members and each operator being adapted to be actuated when the controlling means in its respective set all arrive simultaneously in operative position.

6. The combination of a plurality of sets of coöperating controlling members each member of each set being of different internal dimensions, coöperating controlling means in each member of each set, rotary driving means for said members, an operator in engagement with each set of members and each operator being adapted to be actuated when the controlling means in its respective set all arrive simultaneously in operative position, a secondary coöperating indicating mechanism, and means whereby the actuation of said operator controls the action of said secondary indicating mechanism.

7. The combination with a plurality of sets of coöperating controlling chains mounted to be rotated about a common axis, coöperating controlling means in each chain, means for actuating the controlling means of each individual chain to move at uniform peripheral speeds but in different cycles to bring the controlling means in each chain into operative relation at predetermined intervals, and an operator for each set of chains adapted to be actuated independently when said controlling means are in operative relation.

8. The combination with a plurality of sets of coöperating controlling chains mounted to be rotated about a common axis, coöperating controlling means in each chain of each set, means for actuating the controlling means of each individual chain of each set to move at uniform peripheral speeds but in different cycles to bring the controlling means in the chain of each set into operative relation at predetermined intervals, and an operator adapted to be actuated independently when each set of chains are in operative relation.

9. In a device of the character described, the combination with a chain head comprising a pattern chain, one or more indicating members actuated by the movement of said chain, a controlling device including a plurality of sets of coöperating controlling members all operatively connected to said head, means for continuously imparting a step by step motion to said controlling device, and controlling means in said device whereby said chain head is operated only intermittently and at predetermined intervals.

10. In a device of the character described, the combination with a chain head comprising a pattern chain, one or more indicating members actuated by the movement of said chain, a controlling device operatively connected to said head, means for continuously imparting a step by step motion to said controlling device, a plurality of sets of controlling means in said device, and means controlled by said controlling means for determining the action of said chain head at predetermined intervals.

11. In a device of the character described, the combination with a chain head comprising a pattern chain, one or more indicating members controlled in their action by the action of said pattern chain, of a controlling device operatively connected to said chain head, said device having a plurality of sets of coöperating controlling members, coöperating controlling means in each member of each set, means for actuating the controlling means of each individual member of each set to move in different cycles to bring said controlling means into operative relation at predetermined intervals, and means controlled by each set of members for controlling the action of said chain head.

12. The combination with a controlling device comprising a plurality of sets of coöperating controlling chains, each chain of each set being of different internal dimensions, coöperating controlling means in each chain of each set, a toothed rotary driver engaging all of said chains, an arm in engagement with each set of chains and each arm adapted to be actuated when the controlling means in its respective set all arrive simultaneously in operative position, of a chain head operatively connected to said controlling device, said head comprising a pattern chain, one or more indicating members controlled in their action by the action of said pattern chain, and means whereby said head will start to operate when an operating arm in said controller device is actuated by the positioning of its controlling chains.

In testimony whereof I affix my signature in presence of two witnesses.

WILLARD W. BARDSLEY.

Witnesses:
 HOWARD E. BARLOW,
 E. I. OGDEN.

---

Copies of this patent may be obtained for five cents each, by addressing the "Commissioner of Patents, Washington, D. C."